United States Patent
McFarlane et al.

(10) Patent No.: US 9,276,977 B2
(45) Date of Patent: Mar. 1, 2016

(54) STATION FINGERPRINTING

(71) Applicant: Apple Inc., Cupertino, CA (US)

(72) Inventors: Garrick McFarlane, London (GB); Neale Patton, London (GB); Arvind Shenoy, San Jose, CA (US)

(73) Assignee: Apple Inc., Cupertino, CA (US)

(*) Notice: Subject to any disclaimer, the term of this patent is extended or adjusted under 35 U.S.C. 154(b) by 114 days.

(21) Appl. No.: 13/660,978

(22) Filed: Oct. 25, 2012

(65) Prior Publication Data

US 2014/0122477 A1 May 1, 2014

(51) Int. Cl.
- *G06F 17/30* (2006.01)
- *H04L 29/06* (2006.01)
- *H04H 60/07* (2008.01)
- *H04H 60/33* (2008.01)

(52) U.S. Cl.
CPC .............. *H04L 65/60* (2013.01); *H04H 60/07* (2013.01); *H04H 60/33* (2013.01)

(58) Field of Classification Search
CPC ................ G06F 17/30026; G06F 17/30743; G06F 17/30787; G06F 17/30749; G06F 21/30
See application file for complete search history.

(56) References Cited

U.S. PATENT DOCUMENTS

| | | | |
|---|---|---|---|
| 6,868,440 B1 | 3/2005 | Gupta et al. | |
| 6,987,221 B2 | 1/2006 | Platt | |
| 7,603,434 B2 | 10/2009 | Svendsen | |
| 2008/0256115 A1* | 10/2008 | Beletski et al. | 707/102 |
| 2010/0229094 A1 | 9/2010 | Nakajima et al. | |
| 2011/0321072 A1* | 12/2011 | Patterson et al. | 725/5 |
| 2012/0109961 A1* | 5/2012 | Raichelgauz et al. | 707/737 |
| 2012/0191231 A1* | 7/2012 | Wang | 700/94 |
| 2012/0239175 A1* | 9/2012 | Mohajer et al. | 700/94 |
| 2012/0263305 A1 | 10/2012 | Marko | |
| 2012/0311081 A1* | 12/2012 | Robbin et al. | 709/217 |
| 2013/0052939 A1 | 2/2013 | Anniballi et al. | |
| 2013/0204889 A1 | 8/2013 | Sinha et al. | |

* cited by examiner

*Primary Examiner* — Yuk Ting Choi (74) *Attorney, Agent, or Firm* — Novak Druce Connolly Bove + Quigg LLP (57) ABSTRACT

Disclosed herein are systems, methods, and non-transitory computer-readable storage media for determining encoding media station fingerprints and determining if media station fingerprints are related. Also disclosed herein are systems, methods, and non-transitory computer-readable storage media for allowing client devices to preview sample media stations prior to actually creating a media station, receiving user interaction data relating to the user's activity with a sample media station, storing sample station fingerprints along with client device interaction data and using the client device interaction data to influence media item sequence generation rules for an additional related media station.

12 Claims, 7 Drawing Sheets

STATION FINGERPRINTING

BACKGROUND

1. Technical Field

The present disclosure relates to generating media stations and more specifically to fingerprinting media stations.

2. Introduction

Many users enjoy consuming content such as music or television shows without having to purchase or maintain a copy of the media item. Traditionally, users could accomplish this through radio or television broadcasting. Each station can broadcast a sequence of media items based around the station's programming model, e.g. country music, rock music, talk radio, sports programming, etc. In some cases, the programming model can vary with the day or even time of day, but overall the programming on a particular station is fairly structured. While traditional radio and television broadcasting provide streams of content, which in many cases are free to the end user, traditional broadcasting suffers from a number of drawbacks. One such drawback is that the content distribution model is very rigid. In order to consume the content, a user must tune their device to a particular station. Once on the station, the user is only able to consume the content scheduled for that time period.

The widespread use of the Internet and portable electronic devices has made it possible to offer more flexible content distribution and consumption models. For example, in many cases, a user can carry around a large media collection on a small client device. Since most client media playback applications permit users to create playlists of media items, a user can easily consume a sequence of media items whenever the client device is available. Additionally, many client devices include features that will generate playlist automatically from the media items in the user's media library. Such features can create a content consumption experience similar to that of traditional radio or television broadcasting, but one that permits the user to control when and how the media is consumed. However, under this model, the content consumption is limited to those media items on the device or at least already licensed to the user.

Some media consumptions models include streaming media content to a client device. Some approaches involve allowing clients devices to specify one or more media "station" which attempt to include only media items falling into a particular category and that fit a user's tastes. However, user-specified stations are disjointed and a first station cannot benefit from user interaction data received in a similar station.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining encoding media station fingerprints and determining if media station fingerprints are related.

Some embodiments of the present technology involve hosting a preview station associated with a collection of non-user account specific media selection rules, generating a station fingerprint for the preview station, the station fingerprint being encoded from basic preview station metadata, and storing device interaction data corresponding to a preview of preview station along with the station fingerprint. Some embodiments also involve a media station platform deriving a user-account-specific station using a collection of media-selection rules associated with the preview station and user-account-specific rules. The media station platform can generate a media station ID specific to the derived user-account-specific station and a station fingerprint for the user-account-specific station. Also, the media station platform can determine that the station fingerprint corresponding to the derived user-account-specific station matches the media-station preview fingerprint corresponding to the media-station preview from which the user-account-specific station was derived.

Some embodiments of the present technology involve importing the stored device interaction data into the user-account-specific station when the media station fingerprint for the derived user-account-specific station matches the preview station fingerprint, storing device interaction data associated with a preview of second preview station along with the station fingerprint corresponding to the second preview station, and importing the stored device interaction data associated with the preview of the second preview station into the user-account-specific station when the media station fingerprint for the derived user-account-specific station matches the second preview station fingerprint.

Some embodiments of the present technology relate to systems, computer-readable media, and methods configured for providing a collection of media stations in media station platform, encoding the media stations with media station fingerprints, and comparing the media station fingerprints to determine if one or more of the media stations are related.

In some embodiments, media stations can be displayed in an online store, but are not actually created until a user indicates that he want to create the station. Creating a station involves a media station platform assigning a station identifier to the station, distributing the station identifier to the client device, and tracking user interactions with respect to the created station by referencing the station identifier. However, in some instances, a user may not want to create a new station each time he previews a new artist, genre, etc. or selects a new media items as a seed for a new media station. Therefore, some embodiments of the present technology involve a media station platform configured to allow client devices to preview sample media stations prior to actually creating a media station. In some embodiments, the media station platform sends the client device a sample station fingerprint along with a sequence of media items and receives user interaction data relating to the user's activity with a sample media station, the interaction data describing one or more activities taken by the client with respect to the sequence of media items.

Various types of activities can be taken on the client device including: consuming a media item in the sequence of media items to completion; pausing the sequence of media items during the consumption of a particular media item; skipping ahead in the sequence of media items during the consumption of a particular media item; indicating that a particular media item in the sequence of media items is liked; indicating that a particular media item in the sequence of media items is disliked; indicating that a particular media item in the sequence of media items should never again be included in a sequence of media items for the first media station; and indicating that the sequence of media items for the first media station should include more media items that a similar to a particular media item in relation to musical style, tempo, beat, instruments used, era, etc.

Some embodiments of the present technology involve the media station platform storing sample station fingerprints along with client device interaction data and using the client device interaction data to influence media item sequence generation rules for an additional related media station.

Some embodiments of the present technology involve encoding station fingerprints by providing a collection of media station attributes for media stations. In some embodiments the attributes include a station type attribute, a media item seed type attribute, and a media item seed type value attribute. In some embodiments determining that the media stations are related further includes determining that an exact match exists between the media item seed type attributes and determining that a fuzzy match exists between the media item seed type value attributes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for a way to compare media stations to determine if they are similar. The present disclosure also addresses the need in the art for a way to sample a media station before actually creating the media station and for applying insight learned from client device interaction with one or more sampled media station to a newly created media station.

In some embodiments of the present technology, media stations can be hosted on a network-based media station platform and made available for consumption on a client device. Media stations can be generated as a sequence of media items on the client device, on the media station platform, or on both the client device and the media station platform. In some embodiments of the present technology, the media station platform can be operatively coupled with or integrated within another content distribution platform, such as iTunes, available from Apple Inc. of Cupertino, Calif. The sequence of media items can include media contained in the content distribution platform, media stored on a client device, invitational content items, etc.

The media station platform can be accessed by client devices and played back in a number of ways including via a browser-based interface, a client-side application installed on a client device, a plug-in, etc. The playback process of a sequence of media items can repeat until a user takes an action to terminate or temporarily delay the playback, such as quitting the application, switching to a different media station, pausing playback, or skipping a media item. However, a media station can also be defined to be a finite sequence of media items. Likewise, the media station platform can be configured to enforce rules relating to media playback, such as pausing playback upon determining that a user is no longer consuming the sequence of media items.

A media station can be homogeneous or heterogeneous. That is, a media station can be designed to playback media items all of the same media type or of different media types. For example, a homogeneous media station can playback only audio media items or only video media items. In another example, a heterogeneous media station can playback a mix of audio media items and video media items.

Figure 1:
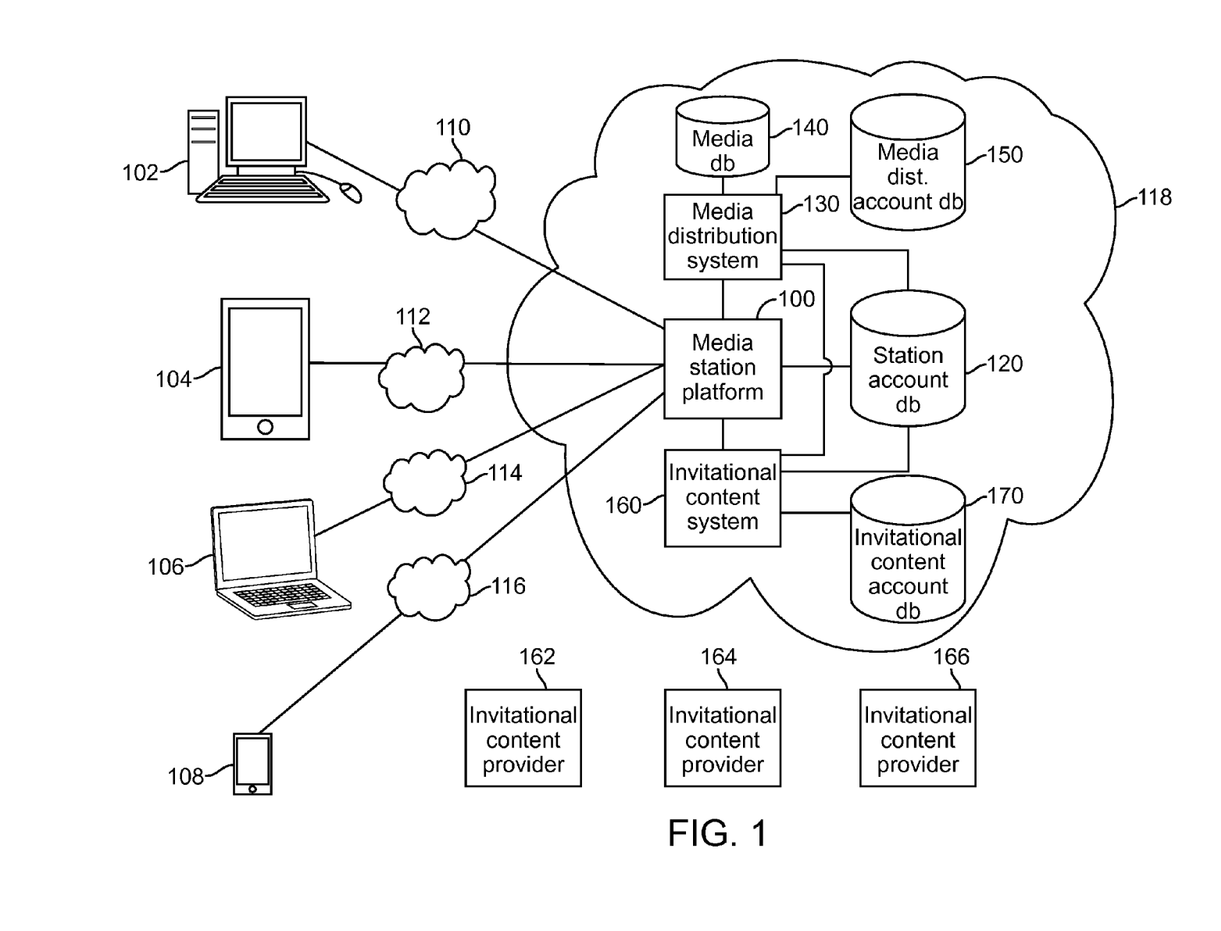
FIG. 1 illustrates an exemplary media station platform according to some embodiments of the present technology.

FIG. 1 illustrates an example of a media station platform 100 according to some embodiments of the present technology. As shown in FIG. 1, a media station platform can be operatively coupled with a plurality of client devices 102, 104, 106, 108 via one or more networks 110, 112, 114, 116, 118. Those with ordinary skill in the art having the benefit of this disclosure will readily understand that the network(s) can comprise any type of network, now known or later developed, and that the networks 110, 112, 114, 116, 118 can comprise the same network or different networks. Likewise, any number and multiple types of client devices can be configured to interact with the media station platform 100.

In some embodiments of the present technology, the media station platform 100 stores information about the users and the client devices that interact with the media station platform 100. Gathering and using data about user can improve the delivery media that may be of interest to users; however, a privacy policy should be adhered to when doing so. A more detailed discussion of privacy policies and concerns is laid out below.

In some embodiments, an account database 120 is integrated with the media station platform 100. In some embodiments, an account database 120 is operatively coupled with the media station platform 100.

In some embodiments of the present technology, the media station platform 100 receives media items from a media distribution system 130, such as iTunes, available from Apple Inc. of Cupertino, Calif. In some embodiments, the media distribution system 130 stores media item identifiers in a media database 140. Likewise, in some embodiments of the present technology, the media distribution system 130 stores user and client device information in an account database. In some embodiments, the media distribution system 130 stores user and client device information in a media distribution account database 150 while in some embodiments the media distribution system 130 stores user and client device information in the station account database 120, the media distribution account database 150, or both.

In some embodiments of the present technology, the media station platform 100 is operatively coupled with an invitational content system 160 configured for delivering invitational content from one or more invitational content providers 162, 164, 166 to client devices 102, 104, 106, 108.

In some embodiments, the invitational content system 160, such as iAD, available from Apple Inc. of Cupertino, Calif., is operatively coupled with the media distribution system 130. In some embodiments, the invitational content system 160 stores user and client device information in an invitational content account database 170, in the station account database 120, in the media distribution account database 150, or combinations thereof.

In some embodiments, the media station platform 100 is configured to allow client devices 102, 104, 106, 108 to create media stations to add to the device or to distribute created stations to client devices. In some embodiments, creating a media station comprises receiving a request from one of the client devices 102, 104, 106, 108 to create a media station. A user of one of the client devices 102, 104, 106, 108 can send a request using the client device to create a media station by selecting a media item in a media station platform 100 client device interface. For example, clicking on a song, the name of an artist, a genre, etc. can cause the client device 102 to send a request to the media station platform 100 to create a media station based around that song, artist, genre, etc. A media item or a media item attribute that is used as a primary basis for media station creation can be referred to as a seed according to some embodiments of the present technology.

In some embodiments, creating a station involves assigning a station identifier to the station, distributing the station identifier to the client device, and tracking user interactions with respect to the created station by referencing the station identifier. Other systems and methods of media station generation that will benefit from the present technology are described in co-pending U.S. patent application Ser. No. 13/609,220, filed on Sep. 10, 2012, entitled Client Side Media Station Generation, the disclosure of which is incorporated herein in its entirety. However, in some instances, a user may not want to create a new station each time he previews a new artist, genre, etc. or selects a new media item as a seed for a new media station.

Therefore, in addition to creating new media stations, some embodiments of the present technology also involve the media station platform 100 offering sample media stations to preview. Sample media stations can behave like regular media stations except that they are not actually created by assigning a station identifier to the station and distributing the station identifier to a client device 102, 104, 106, 108, an invitational content server 160, the media distribution system, or combinations thereof. Instead, by creating sample media stations users can experience a preview of what a sequence of media items might be like if they were to actually create the station. Indeed, a sequence of media items can be generated for a sample station using the same generation rules as an actual station. Likewise, users can refine a sample station by interacting with the sample media station in similar ways as an actual media station, e.g. liking media items, skipping media items, banning media items, consuming media items to completion, etc. However, this interaction data is not stored alongside a station identifier since a station identifier has not been created. Therefore, some embodiments of the present technology involve encoding a station fingerprint for sample stations and associating user interactions with the sample station with the station fingerprint, as is explained in greater detail below.

Sample media stations can be created in various ways and can take various forms. In some embodiments of the present technology, a media station platform 100 can consider information about a user account and determine what sample stations to offer to a particular client device 104 on a media station platform 100 client graphical user interface. For example, in some embodiments of the present technology, the media station platform 100 can consider a media library on a client device 104 or a media library stored in a cloud-based form for a user account associated with a client device 104, analyze the media library(ies) and associated metadata, and suggest one or more sample stations to offer in the media station platform on the client device 104. Similarly, in some embodiments, the media station platform 100 can provide tools for a user to filter sample stations (e.g. by genre) or tools to allow a user to search for sample stations using keywords, filters, etc.

In some embodiments of the present technology, a sample station can comprise a sponsored media station seeded with one or more media items selected by a sponsor. In some embodiments, the media station platform 100 can include one or more sponsors to offer on a client device 106 based on user account information associated with the client device 106 or one or more media libraries associated with user accounts tied to the client device 106. For example, if a client device 106 is associated with a user account having a playlist of media items entitled "Workout Mix" and containing media items with attributes (e.g. genre, tempo, etc.) indicative of exercise or sports, then the media station platform can choose a fitness-related sponsor such as a sporting goods store.

As explained above, a media station platform 100 can be associated with an invitational content system 160, such as iAD, available from Apple Inc. of Cupertino, Calif.

In some embodiments of the present technology, a media station platform 100 host can create a sample media station. For example, a platform host may choose to create a sample station to deliver to client devices to attract users of the client device 108 to consume more media or different types of media. In an illustrative example, a media station platform host can seed a holiday music station and offer to the holiday music station to client devices 102, 104, 106, 108 around the winter holiday season in hopes that users of client devices 102, 104, 106, 108 will consume the media station and possibly purchase media contained thereon.

Figure 2:
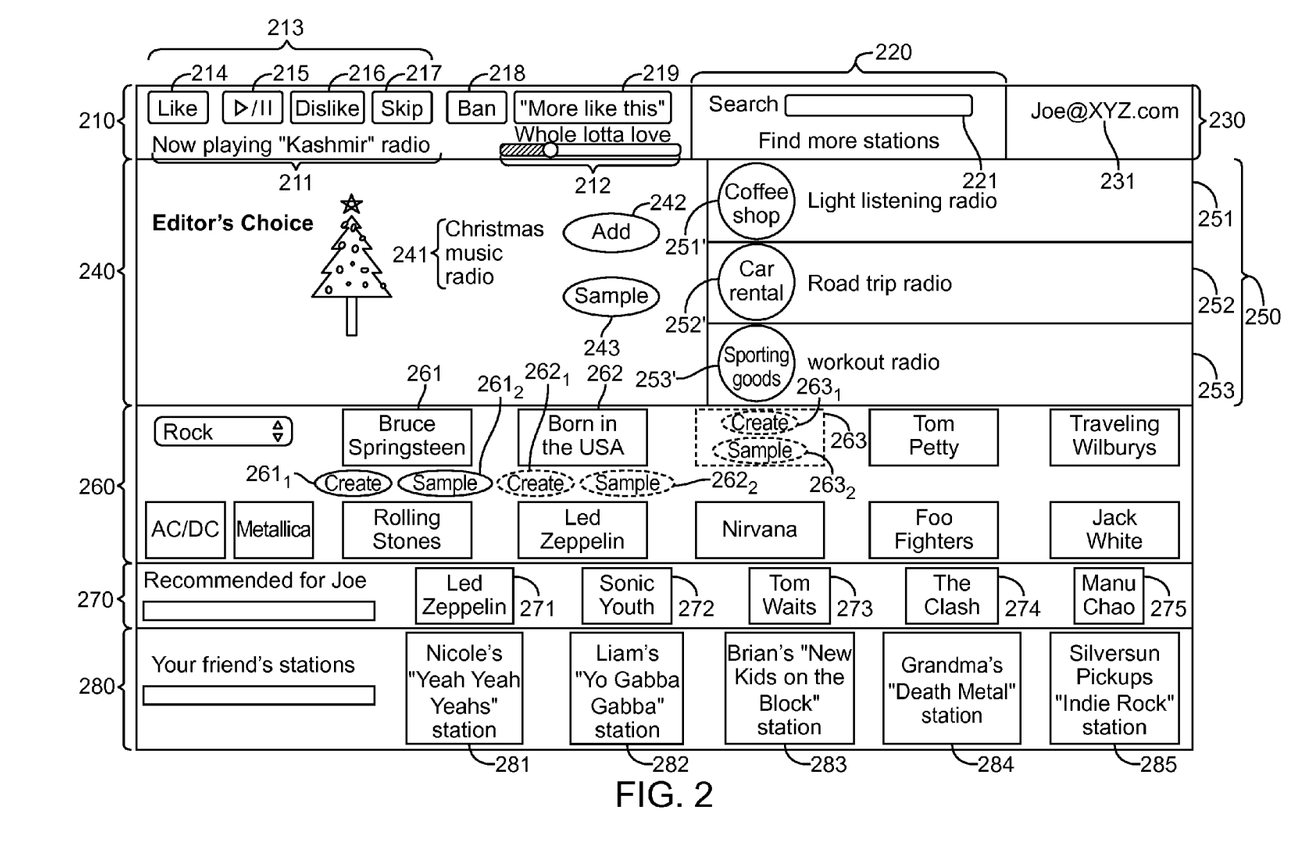
FIG. 2 illustrates an exemplary interface for presenting a plurality of sample media stations on a client device according to some embodiments of the present technology.

FIG. 2 illustrates an exemplary interface 200 for presenting a plurality of sample media stations on a client device according to some embodiments of the present technology. The interface 200 shown in FIG. 2, involves a media station interaction frame 210, a media station search frame 220, an account information frame 230, a platform host editorial media station frame 240, a sponsored media station frame 250, a media station filtering frame 260, a taste data recommendation frame 270, and a social media frame 280.

In some embodiments of the present technology, the media station interaction frame 210 involves an indication of currently selected media station 211 and a media item playback progress bar 212. Additionally, the media station interaction frame 210 involves a collection of activity controls 213 including a button 215 to toggle playing a sequence of media items and pausing playback. Also, the activity controls include buttons 214 and 216 that allow a user to indicate that he likes or dislikes, respectively, a currently played media item. Similarly, the activity controls include buttons 217, 218, and 219 to indicate that the user wants to ban a media item from subsequent playback for this station, to indicate that a user wants to skip a media item in the sequence of media items, and to indicate that the user wants to subsequently hear more media items like the currently playing media item, respectively.

In some embodiments of the present technology, the media station search frame 220 involves a search bar 221 used to allow users to enter search terms to find one or more matching media stations. In some embodiments of the present technology, the account information frame 230 involves account information 231 for a user.

In some embodiments of the present technology, the platform host editorial media station frame 240 identifies one or more media station designed and published by the platform host. The one or more stations are labeled 241 and can be created and distributed to a client using button 242 or sampled using button 243.

In some embodiments of the present technology, the sponsored media station frame 250 involves one or more sponsored media station 251, 252, 253. The sponsored stations 251, 252, 253 can include the logo 251', 252', 253' of the sponsoring entity and can be label in a manner suggestive goods or services offered by the sponsors. For example, a "Light Listening" station 251 can include a sequence of media items suggestive of music heard in a coffee shop. Likewise, a "Road Trip" station 252 can include a sequence of media items that make a long road trip more fun. Similarly, a "Workout" station can include a sequence of media items that inspire rigorous exercise.

Additionally, the sponsored media stations can include media item sequence generation rules that include targeted invitational content from the sponsor. For example, a "Light Listening" station can be sponsored by a coffee shop, the "Road Trip" station can be sponsored by a Rental Car company, and the "Workout" station can be sponsored by a sporting goods company.

In some embodiments of the present technology, the media station filtering frame 260 involves a plurality of media station icons: 261, 262, 263 for example. The types of media stations can include any station seeded by media metadata, such as genre, artist, album, track, popularity, rating, etc.

Also, the media station filtering frame 260 can include a pull-down selection menu 265, which can be used to indicate station attributes, for example the media item genre "Rock." The attributes can then be used to filter a station.

In some embodiments of the present technology, the media station icons of FIG. 2 can be interactive and can create an actual media station 242 or a sample media station 243 when clicked, tapped, or otherwise interacted with by a user. In some embodiments, separate controls are used to indicate user intention to create actual or sample media stations. For example, media station icon 261 van be associated with controls $261_1$ and $261_2$ that are persistently displayed in association with the media station icon 261. In some embodiments, media station icon 262 can be associated with controls $262_1$ and $262_2$ that are displayed in association with the media station icon 262 upon a user hovering over the station with a cursor, placing a finger (non-tap) on a the media station icon 262. Likewise, media station icon 263 is associated with controls $263_1$ and $263_2$ and appear as an overlay on top of media station icon 263 upon a user hovering over the station with a cursor, placing a finger (non-tap) on a the media station icon 263.

In some embodiments of the present technology, the taste data recommendation frame 270 comprises a collection of media station icons 271, 272, 273, 274, 275 selected for the account holder based on taste data from a recommendation system, such as Apple Genius, available from Apple Inc. of Cupertino, Calif. Similarly, in some embodiments of the present technology, the social media frame 280 involves a collection of media station icons 281, 282, 283, 284, 285 selected from friends media stations in a social media system.

As explained herein, sample media stations allow users to preview a media station before actually adding the station to their client devices. Additionally, users can provide feedback on a sample stations in the form of interaction data derived through "liking" a media item, skipping a media item, completing playback of a media item, banning a media item, etc. Additionally, in some embodiments of the present technology, subsequent media stations can use interaction data to help generate a new station's sequence of media items that will more likely be of interest to the user.

Some embodiments of the present technology involve encoding a station fingerprint that describes attributes of the station. According to some embodiments of the present technology, at the time of station creation, the media station platform can search for fingerprints that are similar to the fingerprint of a newly created station to determine if any user interaction data exists that might help the media station platform generate media items in the sequence that are of interest to the station creator.

Figure 3:
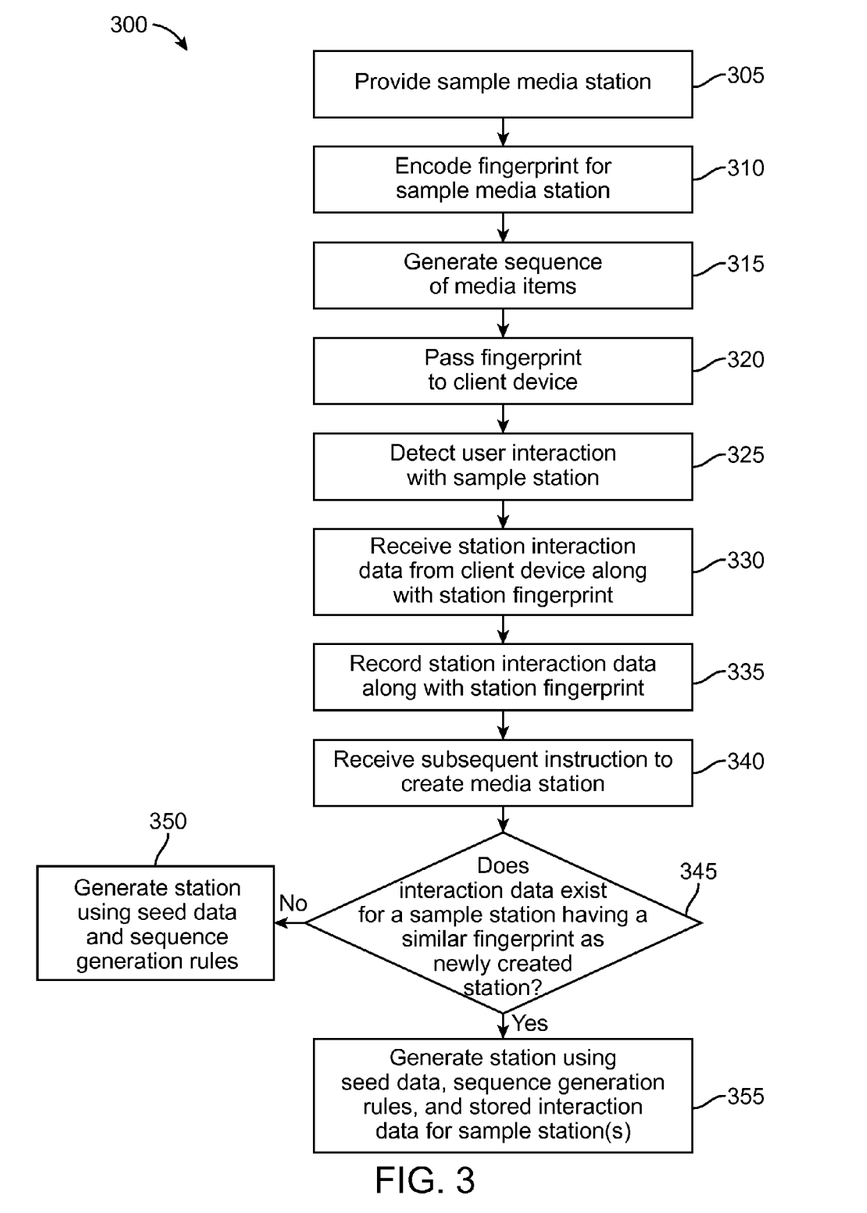
FIG. 3 illustrates an exemplary method for generating a new media station using past interaction data for a similar sample station according to some embodiments of the present technology.

FIG. 3 illustrates an exemplary method 300 for generating a new media station using past interaction data for a similar sample station according to some embodiments of the present technology. The method 300 involves a media station platform providing a sample media station 305. In some embodiments of the present technology, a sample media station initially comprises a station seed describing one or more attributes of a sample station. For example, the station seed can comprise media item artist name, media item genre, media item name (e.g. song name), album name, etc. Additionally, the method 300 involves encoding a fingerprint for the sample media station 310. In general, in some embodiments, the station fingerprint comprises a reversible encoded string describing attributes of the station. Specifics of encoding a station fingerprint will be explained in greater detail below.

Next, the method 300 involves generating a sequence of media items 315 according to media station sequence generation rules. In some embodiments of the present technology, the generation of a sequence of media items involves the same set or a subset of the same rules used to generate a sequence of media items for an actual media station.

Additionally, the method 300 involves passing the encoded fingerprint to a client device and storing it along with station sequence information 320. Also, the method 300 invoices detecting user interaction relating to the sequence of media items 325 via the client device. A wide variety of interactions can be detected that relate to the sequence of media items. For example, the media station platform can detect when a user: consumes the entirety of a media item, skips to a next media item before the completion of a media item, indicates that the user likes a media item, indicates that the user dislikes a media item, indicates that the user never wants to hear the media item again (i.e. bans the media item), indicates that the user wants to consume more media items similar to the media item, pauses the media item, etc. Those with ordinary skill in the art having the benefit of this disclosure will readily understand that a wide variety of interactions, now known or later developed, can be detected by the media station platform.

Next, the method 300 involves the media station platform receiving station interaction data from the client device along with the station fingerprint 330 which was previously passed to the client device. In some embodiments, the client device sends interaction data to the media station platform each time the user interacts with the sample station. In some embodiments, the client device periodically sends interaction data to the media station platform.

The method 300 continues with the media station platform recording station interaction data in a database 335 alongside the station fingerprint. In some embodiments of the present technology, the media station platform stores the interaction data in a relational database in relation to a user account identifier, a client device identifier (e.g. a Universal Device ID), or both a user account identifier and a client device identifier.

In some embodiments of the present technology, the media station platform stores the station fingerprint in a separate file alongside the interaction data. In some embodiments of the present technology, the process of storing interaction data alongside a station fingerprint is useful in identifying a context relating to how a user prefers to consume media items as it relates to a particular station. In a particularly illustrative example, suppose a user creates or samples a media station that is initially seeded by the band, "The Clash." Music by "The Clash" contains elements of roots rock, punk rock, new wave, and reggae, among others. Also suppose the user does not generally like rock music that predominantly involves elements of reggae (e.g. Eric Clapton's song "I Shot the Sherriff"). However, the user enjoys reggae music, in general, and would not mind listening to reggae music in the context of a reggae station. If the user indicates that he dislikes a subsequent media item in the "The Clash" station that is primarily a reggae song, he probably does not want the media station platform to memorialize his general dislike of reggae music across all media stations. Therefore, only associating his "dislike" interaction with the "The Clash" station along with the fingerprint for the station, the media station platform avoids always presupposing that the user will not like reggae music when it comes to other media stations.

The method 300 continues with the media station platform receiving a subsequent instruction to create an actual station 340 and to create a station identifier and distribute the station to associated client devices, as explained above. Upon the creation of a subsequent station, the method 300 determines whether previous interaction data exists for a sample station having a similar fingerprint as the newly created station 345. If not, the method 300 generates the new station using the new station's seed data(um) and normal sequence generation rules 350. However, if previous interaction data does exist for a sample station fingerprint that is similar to the station fingerprint for the newly created station, then the method involves generating the new station with the new station's seed data (um), normal sequence generation rules, and the stored interaction data for the similar sample station fingerprint 355. Consequently, the new station will benefit from the past interaction data.

Figure 4:
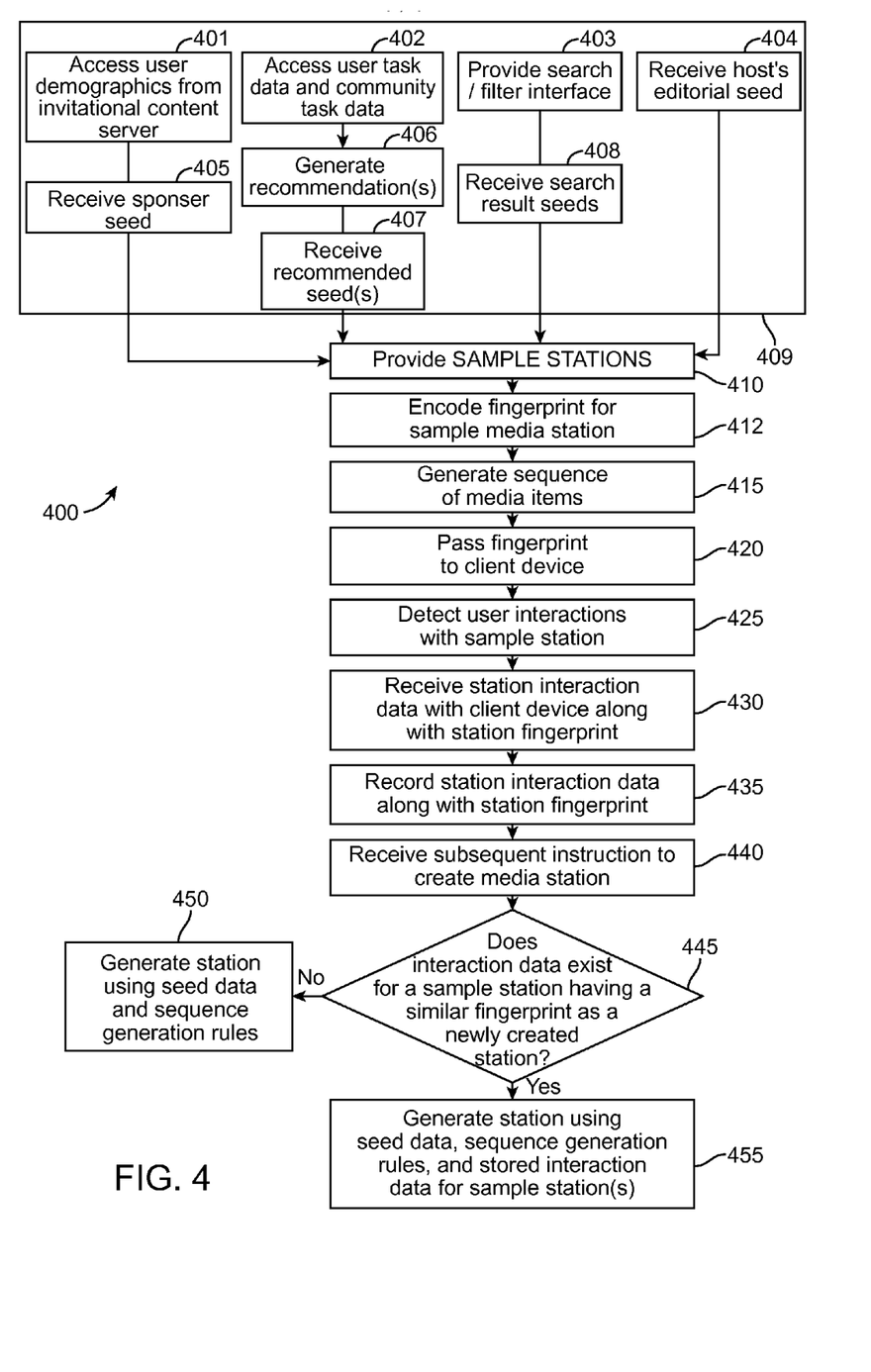
FIG. 4 illustrates another exemplary method for generating a new media station using past interaction data for a similar sample station according to some embodiments of the present technology.

FIG. 4 illustrates another exemplary method 400 for generating a new media station using past interaction data for a similar sample station or a similar station that has already been created according to some embodiments of the present technology. The method 400 of FIG. 4 includes a variety of ways for seeding or initializing a sample station 409. In some embodiments of the present technology, the method 400 can involve some or all of the ways for seeding or initializing a sample station.

In some embodiments, the media station platform can access user demographic information from an invitational content server 401 and receive media station seed information from a sponsor 405 to be used in seeding a sample media station. In some embodiments, the method 400 involves accessing user taste data and community taste data 402 and generating recommended media station seeds 406. Also, the media station platform receives recommended station seeds to be used in seeding a sample media station 407. In some embodiments, the method 400 involves providing a user search or filter interface 403 and receiving search or filter results 408 to be used in seeding a sample media station. In some embodiments, the method 400 involves receiving a platform host's editorial seed data 404 to be used in seeding a sample media station.

Next, the method 400 involves a media station platform providing a sample media station 410. Additionally, the method 400 involves encoding a fingerprint for the sample media station 412 and generating a sequence of media items 415 according to media station sequence generation rules.

Next, the method 400 involves passing the encoded fingerprint to a client device and storing it along with station sequence information 420 and detecting user interaction relating to the sequence of media items 425 via the client device.

Next, the method 400 involves the media station platform receiving station interaction data from the client device along with the station fingerprint 430 and the media station platform recording station interaction data in a database 435 alongside the station fingerprint.

The method 400 continues with the media station platform receiving a subsequent instruction to create an actual station 440 and to create a station identifier and distribute the station to associated client devices. Upon the creation of a subsequent station, the method 400 determines 445 whether previous interaction data exists for a sample station having a similar fingerprint as the newly created station. If not, the method 400 generates the new station using the new station's seed data(um) and normal sequence generation rules 450. However, if previous interaction data does exist for a sample station fingerprint that is similar to the station fingerprint for the newly created station, then the method involves generating the new station with the new station's seed data(um), normal sequence generation rules, as well as the stored interaction data for the similar sample station fingerprint 455.

Figure 5:
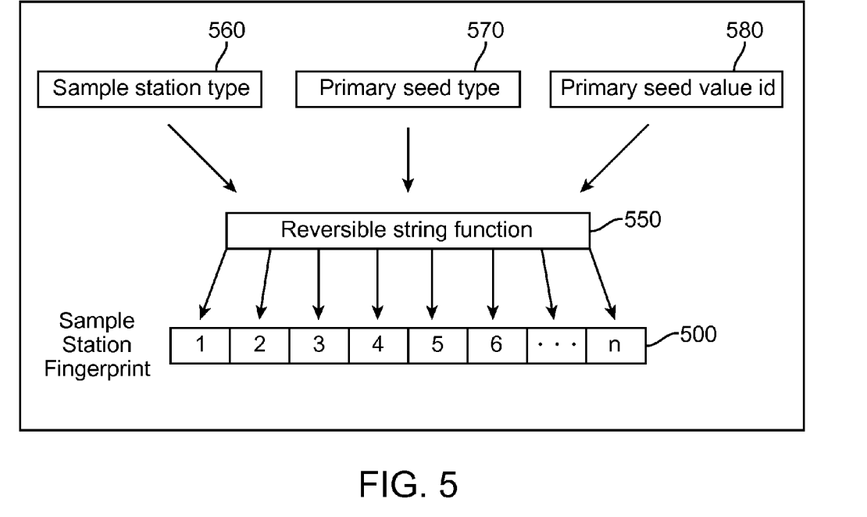
FIG. 5 illustrates an exemplary technique for assembling station fingerprints according to some embodiments of the present technology.
Figure 6:
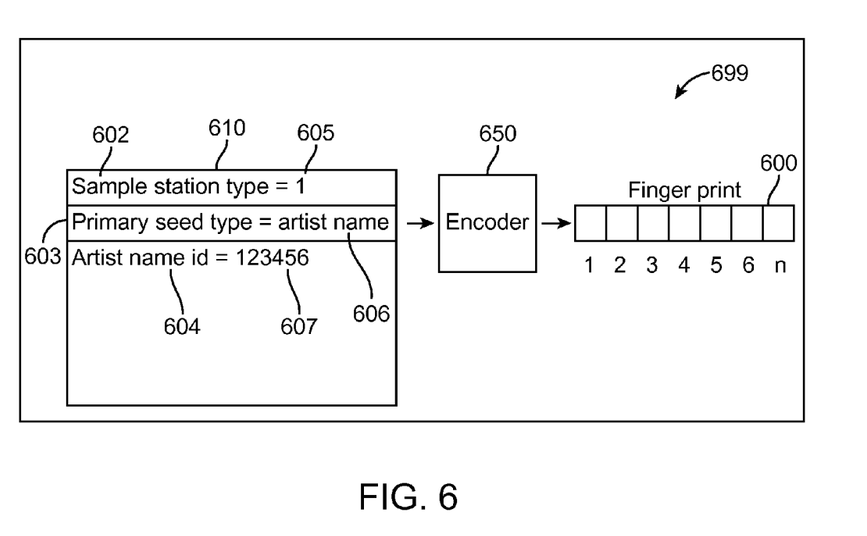
FIG. 6 illustrates a system for creating a sample station fingerprint according to some embodiments of the present technology.

As explained herein, station fingerprints are very useful tools for characterizing types of media stations. In some embodiments of the present technology, station fingerprints are coded as reversible strings which, when decoded, provide information about the station. FIGS. 5-6 illustrate techniques for assembling station fingerprints according to some embodiments of the present technology.

FIG. 5 illustrates an exemplary sample station fingerprint 500 according to some embodiments of the present technology. The sample station fingerprint 500 comprises an input string of integers that has been encoded by a reversible string function 550. The reversible string function 550 accepts inputs 560, 570, 580 in the form of station attributes.

Various station attributes can be used to encode a station fingerprint. The inputs 560, 570, 580 illustrate in FIG. 5 comprise a high-level sample station type, a primary attribute type, and a primary attribute value identifier. For example, in some embodiments of the present technology, a high-level sample station type descriptor for a media station can be used to encode a station fingerprint. Additionally, a music station's primary attribute type can be the station seed (e.g. artist name, media item genre type, or media item track title) used to create the sample station can be used to encode a station fingerprint. Also, a primary attribute value (i.e. the actual artist name, the actual genre, or the actual track title) can be used to encode a station fingerprint.

In some embodiments, a media station can be generated by a collection of seeds and corresponding seed attribute values. According to these embodiments, a station fingerprint can include encoded data for some or all of the station seeds. In some embodiments, a station fingerprint can include a subset of station seeds or only the significant station seeds, as determined by the platform operator. Although some specific examples of generating station fingerprints using station attributes are explicitly provided, those with ordinary skill in the art having the benefit of this disclosure will readily understand that any type of attribute, metadata, taste data, invitational content targeting data, initial station seed data, subsequent station seed data, subsequent station media item data, etc. can be used to encode a station fingerprint.

FIG. 6 illustrates a system 699 for creating a sample station fingerprint 600 according to some embodiments of the present technology. In some embodiments, the encoder 650 comprises hardware, software, firmware, etc. for applying a reversible string function. The input 610 for the encoder 650 comprises a file containing station attribute types 602, 603, 604 and attribute values 605, 606, 607. As shown in FIG. 6, the attribute types include a high-level sample station type, a primary seed type, and a primary seed value identifier. In some embodiments of the present technology, the attribute values are stored alongside every media item in a media item repository or in a separate relational repository that matches media items with media item attribute values.

Also, as explained above, station fingerprints can be used to match similar sample station for the purpose of supplementing the normal media generation rules for newly created stations with past interaction data. Therefore, some embodiments of the present technology involve techniques for matching station fingerprints that result in matching stations that are similar enough that past interaction data will accurately reflect user taste, but not too similar so as to exclude all but almost exact station matches.

Figure 7:
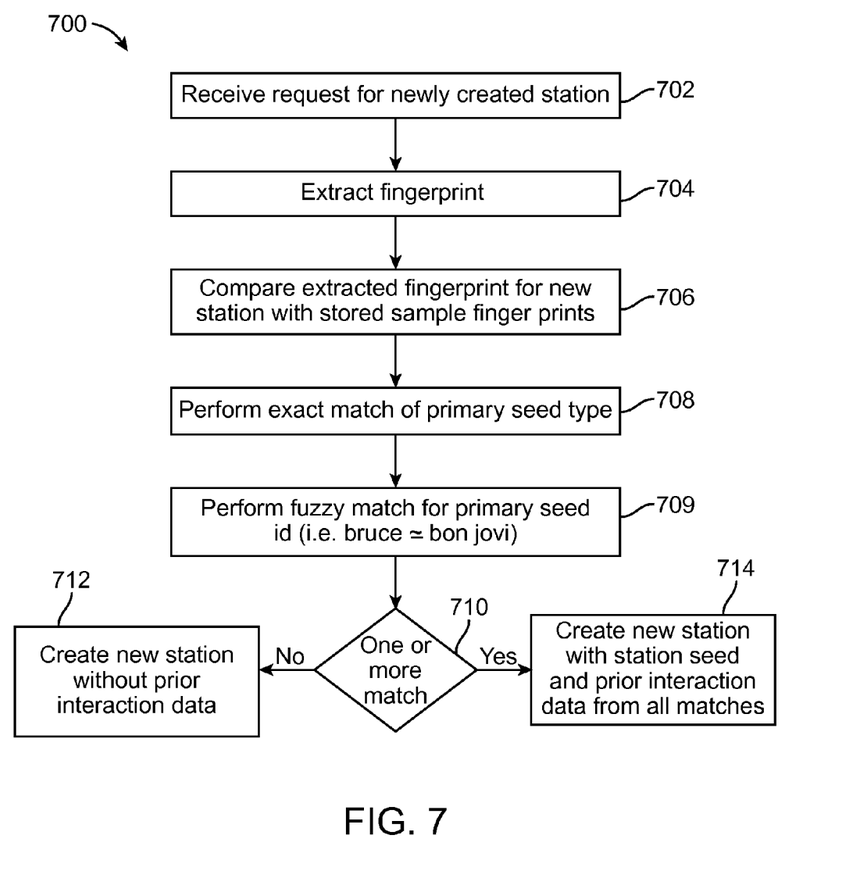
FIG. 7 illustrates an exemplary method for matching station fingerprints according to some embodiments of the present technology.

FIG. 7 illustrates an exemplary method 700 for matching station fingerprints according to some embodiments of the present technology. The method 700 involves receiving a request for a newly created station 702. In some embodiments, the request is received when a user click, taps, or otherwise interacts with a button for creating a media station. Next, the station fingerprint is extracted from the media station 704 and compared with fingerprints stored for previously sampled media stations 706.

In some embodiments of the present technology, station fingerprints are constituted based on a set of rules for encoding only the primary attribute used to create the station, i.e. the station seed, into the station fingerprint. For example, in some embodiments, only the station type, the station seed type, and station seed value are encoded into a station fingerprint. Subsequently, when determining whether two or more stations are similar, the fingerprints are compared to resolve whether the fingerprints match.

Various other comparison techniques will be readily apparent to those with ordinary skill in the art having the benefit of the present disclosure; however, for illustrative purposes a specific comparison technique is disclosed explicitly herein. According to FIG. 7, fingerprint comparison involves first performing an exact match comparison between primary seed type for the extracted fingerprint and the sampled fingerprints 708. Next, a fuzzy match comparison 709 is performed on any sampled fingerprints that involve an exact primary seed type match with the newly created station fingerprint—the fuzzy match comparison involving comparing the primary seed identifiers.

Next, the method determines 710 if any matches exist. If not, a new station is created without any interaction data from previously sampled media stations 712. However, if the fingerprint of the newly created station matches any fingerprints for previously sampled media stations, the method 700 involves creating the new station based on the station seed and with prior interaction data from matching sample stations 714 to be used to inform the new stations media sequence generation rules.

Figure 8:
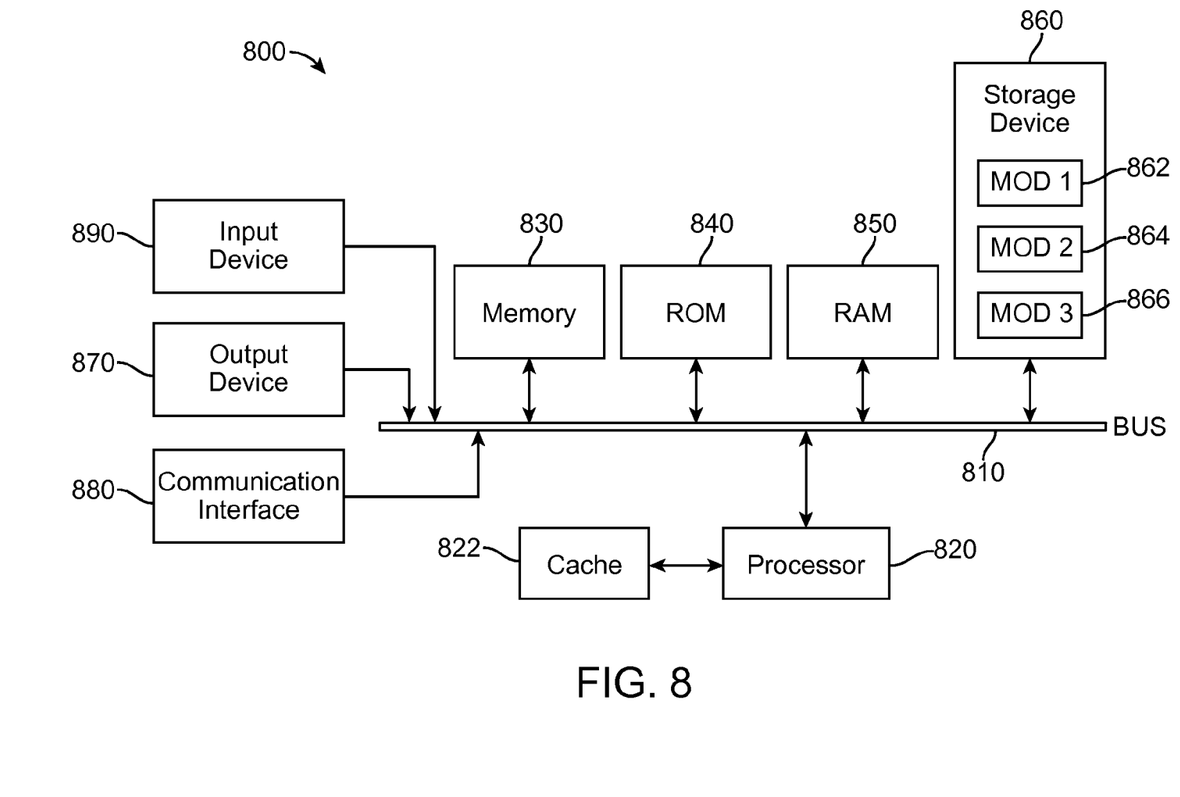
FIG. 8 illustrates a basic general-purpose system or computing device, which can be employed to practice the concepts according to some embodiments of the present technology.

FIG. 8 illustrates a basic general-purpose system or computing device, which can be employed to practice the concepts according to some embodiments of the present technology. With reference to FIG. 8, an exemplary system 800 includes a general-purpose computing device 800, including a processing unit (CPU or processor) 820 and a system bus 810 that couples various system components including the system memory 830 such as read only memory (ROM) 840 and random access memory (RAM) 850 to the processor 820. The system 800 can include a cache 822 connected directly with, in close proximity to, or integrated as part of the processor 820. The system 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the device 800 is a small, handheld computing device, a desktop computer, or a computer server.

Although the exemplary embodiment described herein employs the hard disk 860, it should be appreciated by those skilled in the art that other types of computer readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 8 illustrates three modules Mod1 862, Mod2 864 and Mod3 866 which are modules configured to control the processor 820. These modules may be stored on the storage device 860 and loaded into RAM 850 or memory 830 at runtime or may be stored as would be known in the art in other computer-readable memory locations.

For the sake of clarity, the method is discussed in terms of an exemplary system 800 as shown in FIG. 8 configured to practice the method. The steps outlined herein are exemplary and can be implemented in any combination thereof, including combinations that exclude, add, or modify certain steps.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
hosting, by a media station platform, a first preview station of streaming media items, the first preview station generated based on a collection of non-user-account-specific media selection rules;
generating, by the media station platform, a first station fingerprint for the first preview station, the first station fingerprint being generated from basic metadata of media items selected for the first preview station;
receiving, by the media station platform, client interaction data corresponding to the first preview station, the client interaction data describing feedback received by a client device from a first user of the client device while the first preview station is streamed on the client device, the feedback indicating the first user's taste for media items streamed in the first preview station, and the feedback received from the client device through the first user's interactions with the first preview station;
receiving, by the media station platform, a request to generate a new user-account-specific station based on seed data provided by the first user;
generating, by the media station platform, a second station fingerprint for the new user-account-specific station, the second station fingerprint generated from the seed data provided by the first user;
determining, by the media station platform, that the second station fingerprint corresponding to the new user-account-specific station is similar to the first station fingerprint corresponding to the first preview station; and
generating, by the media station platform, the new user-account-specific station based on the seed data provided by the first user and the client interaction data describing feedback indicating the first user's taste for media items streamed in the first preview station.

2. The computer-implemented method of claim 1 wherein, the seed data includes one or more media items selected by the first user and the second station fingerprint is generated based on metadata describing the one or more media items selected by the first user.

3. The computer-implemented method of claim 1, wherein determining that the second station fingerprint corresponding to the new user-account specific station is similar to the first station fingerprint corresponding to the first preview station comprises:
determining that a match exists between the first station fingerprint and the second station fingerprint.

4. The computer-implemented method of claim 1, further comprising:
determining that the second station fingerprint corresponding to the new user-account-specific station is similar to a third station fingerprint corresponding to a second preview station associated with second client interaction data describing feedback indicating the first user's taste for media items streamed in the second preview station, wherein the new-user-account-specific station is further generated based on the second client interaction data.

5. A media station platform system comprising:
a computer processor; and a memory containing instructions that, when executed, cause the computer processor to:
- host a first preview station of streaming media items, the first preview station generated based on a collection of non-user-account-specific media selection rules;
- generate a first station fingerprint for the first preview station, the first station fingerprint being generated from basic metadata of media items selected for the first preview station;
- receive client interaction data corresponding to the first preview station, the client interaction data describing feedback received by a client device from a first user of the client device while the first preview station is streamed on the client device, the feedback indicating the first user's taste for media items streamed in the first preview station, and the feedback received from the client device through the first user's interactions with the first preview station;
- receive a request to generate a new user-account-specific station based on seed data provided by the first user;
- generate a second station fingerprint for the new user-account-specific station, the second station fingerprint generated from the seed data provided by the first user;
- determine that the second station fingerprint corresponding to the new user-account-specific station is similar to the first station fingerprint corresponding to the first preview station; and
- generate the new user-account-specific station based on the seed data provided by the first user and the client interaction data describing feedback indicating the first user's taste for media items streamed in the first preview station.

6. The media station platform system of claim 5, wherein the seed data includes one or more media items selected by the first user and the second station fingerprint is generated based on metadata describing the one or more media items selected by the first user.

7. The media station platform system of claim 5, wherein determining that the second station fingerprint corresponding to the new user-account specific station is similar to the first station fingerprint corresponding to the first preview station comprises:
- determining that a match exists between the first station fingerprint and the second station fingerprint.

8. The media station platform system of claim 5, wherein the instructions further cause the computer processor to:
- determine that the second station fingerprint corresponding to the new user-account-specific station is similar to a third station fingerprint corresponding to a second preview station associated with second client interaction data describing feedback indicating the first user's taste for media items streamed in the second preview station, wherein the new-user-account-specific station is further generated based on the second client interaction data.

9. A non-transitory computer readable medium containing instructions that, when executed by a computer processor, cause the computer processor to:
- host a first preview station of streaming media items, the first preview station generated based on a collection of non-user-account-specific media selection rules;
- generate a first station fingerprint for the first preview station, the first station fingerprint being generated from basic metadata of media items selected for the first preview station;
- receive client interaction data corresponding to the first preview station, the client interaction data describing feedback received by a client device from a first user of the client device while the first preview station is streamed on the client device, the feedback indicating the first user's taste for media items streamed in the first preview station, and the feedback received from the client device through the first user's interactions with the first preview station;
- receive a request to generate a new user-account-specific station based on seed data provided by the first user;
- generate a second station fingerprint for the new user-account-specific station, the second station fingerprint generated from the seed data provided by the first user;
- determine that the second station fingerprint corresponding to the new user-account-specific station is similar to the first station fingerprint corresponding to the first preview station; and
- generate the new user-account-specific station based on the seed data provided by the first user and the client interaction data describing feedback indicating the first user's taste for media items streamed in the first preview station.

10. The non-transitory computer readable medium of claim 9, wherein the seed data includes one or more media items selected by the first user and the second station fingerprint is generated based on metadata describing the one or more media items selected by the first user.

11. The non-transitory computer readable medium of claim 9, wherein determining that the second station fingerprint corresponding to the new user-account specific station is similar to the first station fingerprint corresponding to the first preview station comprises:
- determining that a match exists between the first station fingerprint and the second station fingerprint.

12. The non-transitory computer readable medium of claim 9, wherein the instructions further cause the computer processor to:
- determine that the second station fingerprint corresponding to the new user-account-specific station is similar to a third station fingerprint corresponding to a second preview station associated with second client interaction data describing feedback indicating the first user's taste for media items streamed in the second preview station, wherein the new-user-account-specific station is further generated based on the second client interaction data.

* * * * *